Figure 1:
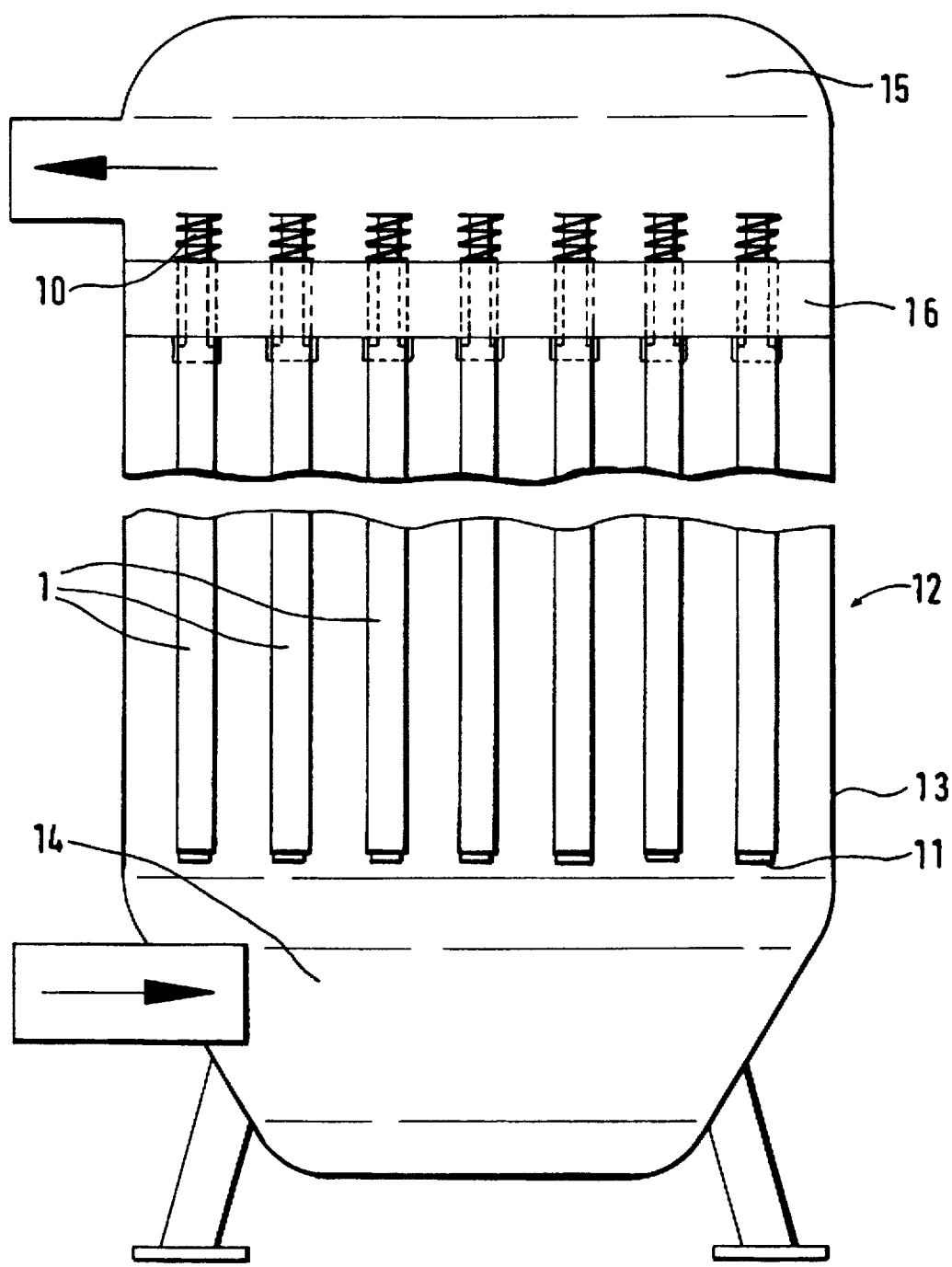

United States Patent [19]

Jungi et al.

[11] Patent Number: 5,792,353
[45] Date of Patent: Aug. 11, 1998

[54] HELICAL FILTER CANDLE INCLUDING EVENLY SPACED TURNS AND COMPRESSED ENDS AND METHOD OF ITS MANUFACTURE

[75] Inventors: Niklaus Jungi, Engelburg; Ulrich Schrader, Bernhardzell, both of Switzerland

[73] Assignee: Filtrox-Werk AG, St. Gallen, Switzerland

[21] Appl. No.: 756,475

[22] Filed: Nov. 26, 1996

[30] Foreign Application Priority Data

May 31, 1996 [CH] Switzerland .............. 1379/96

[51] Int. Cl.$^6$ .............................. B01D 29/48
[52] U.S. Cl. ............... 210/350; 210/356; 210/357; 210/497.1; 210/323.2; 29/896.6; 29/896.61; 29/896.62
[58] Field of Search ............... 29/896.6, 896.61, 29/896.62; 210/350, 356, 357, 497.1, 323.1, 323.2

[56] References Cited

U.S. PATENT DOCUMENTS

| | | | |
|---|---|---|---|
| 2,654,124 | 10/1953 | Layte | 210/497.1 |
| 2,682,309 | 6/1954 | Banchback | 166/231 |
| 2,729,294 | 1/1956 | Adams | 210/497.1 |
| 3,975,274 | 8/1976 | Nommensen | 210/497.1 |
| 4,365,669 | 12/1982 | Wagner et al. | 210/497.1 |
| 4,742,872 | 5/1988 | Geske | 210/497.1 |
| 4,804,481 | 2/1989 | Lennartz | 210/350 |
| 5,207,930 | 5/1993 | Kannan | 210/350 |

FOREIGN PATENT DOCUMENTS

| | | |
|---|---|---|
| 203 206 B1 | 3/1988 | European Pat. Off. . |
| 2 526 478 | 5/1983 | France . |
| 28 49 132 | 5/1980 | Germany . |
| 39 16 888 | 11/1990 | Germany . |
| 41 01 168 | 11/1994 | Germany . |
| 93 11 019 | 1/1995 | Germany . |

*Primary Examiner*—W. L. Walker
*Attorney, Agent, or Firm*—Shoemaker and Mattare, Ltd.

[57] ABSTRACT

In order to avoid dead spaces which are difficult to subject to backflushing and in which particles can be deposited, a special helical filter candle, a method of manufacture of said helical filter candle as well as an end portion (11) for a helical filter candle (1) is created. The helical filter candle (1) comprises a wire (2) wound in windings (3) onto a support structure (4) of support rods (5). At one end, an end portion (11) is welded to said support rods (5). The last of the windings (3) is ground flat in such a way that a spacing of uniform width arises between the surface of the end portion (11) and the final winding (3). During manufacture of the helical filter candle (1), the wire is wound onto the support rods (5) in windings (3), wherein the spacing (7) between the individual windings in a middle area (6) of the support rods (5) is less than in an end area (8) of approximately 3 to 5 windings. On welding of the end portion (11) onto the support rods (5), the end area (8) of said support rods (5) is heated, and shortened through the force applied. After welding, the spacing between the windings over the entire length of the filter candle (1), i.e. both in the middle area (6) and the end area (8), possesses the same spacing width.

8 Claims, 4 Drawing Sheets

HELICAL FILTER CANDLE INCLUDING EVENLY SPACED TURNS AND COMPRESSED ENDS AND METHOD OF ITS MANUFACTURE

The invention concerns a helical filter candle, a method of its manufacture as well as an end piece for a helical filter candle according to the preamble to the independent patent claims.

For the filtration of liquids, in particular beverages such as beer, backflushable filter arrangements with precoated candle filters are frequently used. Such filter arrangements are separated into a filtrate space and a non-filtrate space by means of a perforated plate possessing openings. Filter candles are affixed within said openings, in particular precoated filters. In order that the liquid to be cleansed can reach the filtrate space from the non-filtrate space, it must flow through the surface of the filter candles, particles in the liquid thus being retained. Helical filter candles are frequently used, wherein a wire is wound in the form of a spiral onto a holding rod in such a way that a spacing of a precisely defined size (typically 40 to 100 μ) is formed between the individual windings.

This type of filter arrangement is known from EP 203 206, for example. A holder device is inserted into the openings of the perforated plate and the filter candles are screw-mounted upon said holder device. The filter candle possesses an up-flow pipe on its inside, the filtered liquid being able to rise through said up-flow pipe from within the filter candle into the filtrate space.

It has now been demonstrated that, in particular in the end area of the filter candle, because of the sleeves surrounding the end area, dead-spaces can be formed in which particles can be deposited, and this can lead to a corresponding growth in bacteria or fungi.

Problems will arise in particular due to the increasing use of cold filtration of beer. A further problem is that these dead spaces are hard to reach when cleansing the filter candle by means of backflushing.

With so-called settling filtration, a filtration aid (such as Kieselguhr) is applied to the outside surface of the filter candle. From time to time the particles removed from the cleansed liquid require removal from the surface of the filter candle. To this end, the direction of flow of the filter arrangement is reversed and the filter candles are rinsed through with the cleansing medium in the reverse direction. Through this backflushing, the filter cake on the surface of the filter candle, consisting of filter aid and retained particles or sludge, will be dislodged.

According to the prior art, however, the dead spaces in the area of the end of the filter are mostly either subjected to poor rinse-through during such backflushing, or not at all.

The purpose of the invention is to avoid the disadvantages of the prior art and in particular to create a filter candle that is mechanically stable and simple to manufacture and possesses no spaces in its end area in which particles could settle and which are either impossible or difficult to subject to backflushing. The filter candle should be able to be manufactured economically. A further purpose of the invention is to create a method of manufacture of such a filter candle. A still further purpose of the invention is to create an end portion for a filter candle that avoids the aforementioned disadvantages of the prior art and in particular avoids the spaces in the ends of the filter candle that are difficult to subject to backflushing.

According to the invention, these purposes are fulfilled with a filter candle, with a method of manufacture as well as with an end portion for a filter candle possessing the features of the characterizing portions of the independent claims.

A helical filter candle for precoated filtration possesses a support structure comprising support rods around which a wire is wound in helical windings. A spacing is left between the windings of the wire. This spacing is dimensioned in such a way that the particles of the liquid to be subjected to filtration cannot pass between the individual windings from the non-filtrate space of a filter arrangement and reach the inside of the helical filter candle enclosed within the windings of the wire. It is here a principle feature that the spacing width remains within the stipulated tolerance over the entire length of the helical filter candle in order that the filtration aid and particles are retained in a uniform way and also do not obstruct the spacings.

At least on one side, the wire structure is welded to a connection piece. Said connection piece serves on the one hand to close off the inside space of the filter candle from the non-filtrate space of a filter arrangement, and on the other hand to hold the filter candle in the holder arrangement of a filtration plant.

The support rods are shortened in an end area adjacent to the connection piece. Nevertheless, the spacing between the windings of the wire possesses an approximately uniform spacing width over the entire filter candle (within tolerance).

Through this specific construction, the provision of a sleeve at the end and/or the start area of the filter can be dispensed with. Accordingly, the formation of dead spaces in the end area or start area of the filter candle is avoided.

In another particularly advantageous embodiment, the support structure is provided at one end with an end portion, said end portion separating the inside of the filter candle from the non-filtrate space of a filter arrangement. The wire wound around the wire structure at its end oriented towards the end portion and/or the surface of the end portion oriented towards the head piece are worked in such a way that a spacing is formed between the final winding of the wire and the surface of the end portion, said spacing in principle possessing the same width as the spacing defined between the windings of the wire.

In a first embodiment, the wire is ground flat in the area of its final winding in such a way that it comes to lie in a plane that runs vertical to the axis of the filter candle. Accordingly, a spacing of constant width is formed between the surface of the end portion and the final winding of the wire. Through dimensioning of the support rods or through definition of the start point of the initial winding of the wire on the support rods, the width of this spacing can be precisely determined. The spacing can also be reduced to zero if the final winding is permitted to make contact on the end portion.

In another embodiment, the end portion possesses an circumferential edge pointing towards the inside space of the filter candle and running at a pitch corresponding to the pitch of the helically applied wire. Also with this construction, a spacing is attained between the end portion and the final winding, said spacing possessing a constant width around the entire circumference.

The disadvantages of the prior art can also be reduced if the end portion closing off the filter candle is provided with perforations, the mean diameter of said perforations corresponding approximately to the width of a spacing of a precoated filter candle. Accordingly, when backflushing the filter candle, the rinsing medium can exit through the end portion, and potential dead spaces in the end area of the filter candle are likewise included in this backflushing.

A particularly advantageous helical filter candle possesses an end portion with a middle area and an edge area.

With that, the middle area lies closer to the head portion of the filter candle than the edge area. This dimensioning provides a particularly advantageous flow pattern when backflushing the filter candle with a cleansing liquid.

Additionally, the end portion advantageously possesses a circumferential bead, said bead being wedge-shaped in cross section, on which the support rods of the support structure of a filter candle can bear against and locate.

In the case of a method of manufacturing a helical filter candle according to the invention, in an initial step the wire is applied in a helical line to a wire structure of supporting rods. The connection between the wire and the support structure is generally created by means of localised welding. A spacing of a spacing width in the range of 10–250 µ and preferably 40–110 µ is left between the windings of the wire in a middle area of the support structure. With at least in each case three windings arranged in the end area of the support structure, a spacing is left possessing a greater width than in the middle area of the support structure. This greater spacing width depends on the dimensions of the support rods and can amount to approximately 500 µ.

In a second step, a head and/or an end portion is welded on to the end area or areas of the support structure. The force and heat caused by electrical welding will shorten the support rods in their end area. A principle feature of the invention is that the support rods are shortened in such a way that the spacing between the windings of the wire after shortening in the end areas essentially possess a width lying in the aforementioned tolerance range of 10 to 250 µ and preferably 40 to 110 µ.

It is particularly beneficial if the final winding of the wire is ground flat in the end area of the support structure prior to welding of the head and/or end portion so that the final winding comes to lie in a plane that is vertical to the axis of the helical filter candle, i.e. essentially vertical to the longitudinal direction of the support rods.

In the following embodiments the invention is explained in more detail, with the aid of the drawings: namely, FIG. 1 a filter arrangement with precoatable filter candles, FIG. 2 a side view/cross section of a filter candle according to the invention, FIG. 3 a plan view of the filter candle along the line A—A in FIG. 2, FIG. 4a a cross section through the lower portion of the filter candle shown in 2a, FIG. 4b a side view of the end portion of the filter candle according to FIG. 2, FIG. 5 an enlarged detail of the two final windings of a filter candle according to the invention, FIGS. 6a and 6b methodical steps showing the manufacturing methods according to the invention, FIG. 7 a cross section through an end portion with a filter candle possessing the features of the invention, FIG. 8 a cross section through a further embodiment of anend portion, and FIGS. 9a to 10 further embodiments of end portions possessing the features of the invention.

FIG. 1 shows a filter arrangement 12 with helical filter candles 1 according to the invention. The filter arrangement 12 possesses a housing 13, said housing being separated into a filtrate space 15 and a non-filtrate space 14 by means of a perforated plate 16. The helical filter candles 1 are affixed in the perforated plate 16 by means of a head portion 10, and hang free within the non-filtrate space 14. The inside of the helical filter candle 1 is, at the lower end of the helical filter candle 1, separated from the non-filtrate space 14 by an end portion 11.

Figure 2:
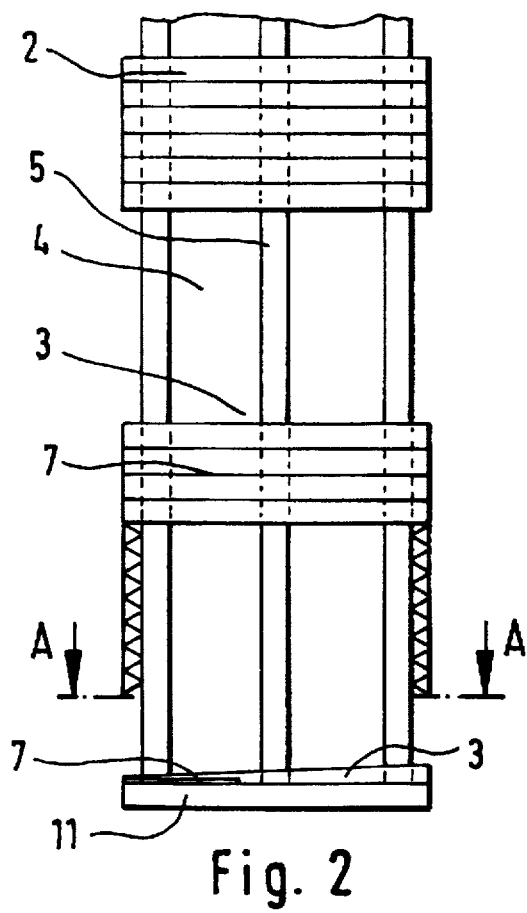

FIG. 2 shows the lower portion of a helical filter candle in a side view, respectively in cross section. The helical filter candle 1 in principle comprises a support structure 4 of approximately cylindrically arranged support rods 5 upon which a wire 2 is wound helically in windings 3. The windings 3 are laid at a mutual distance around the support rods 5 in such a way that a spacing 7 is left between any two adjacent windings 3. The wire 2 preferably possesses a triangular profile so that a narrower spacing 7 is formed on the surface of the filter candle, said spacing 7 widening towards the inside of the filter candle. The final winding 3 of the wire 2 is ground in such a way that the lower end of the winding lies in a plane that is vertical to the axis of the helical filter candle 1, i.e. vertical to the support rods 5.

The lower end of the helical filter candle is closed off with an end portion 11 welded to the support rods 5. Through grinding flat the last of the windings 3 of the wire 2, a spacing of a uniform width will arise between the wire 2 and the end portion 11. When welding the end portion 11 this spacing 7 can be so selected that its width corresponds approximately to the width of the spacing 7 enclosed between the individual windings 3. Accordingly, sealing of the helical filter candle in the end portion can be dispensed with. The spacing 7 between the end portion 11 and the wire 2 is used for filtration in a similar way to the spacing 7 enclosed between the windings 3. For the filtration of beer, the spacing width lies typically in the range 40–110 µ.

Figure 3:
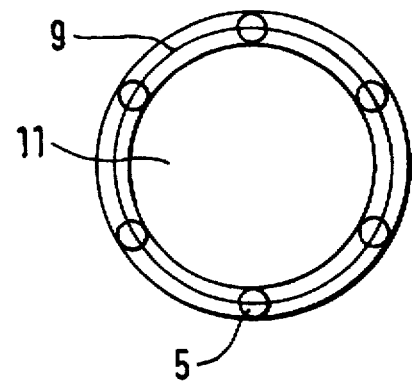

FIG. 3 shows a cross section through the filter candle shown in FIG. 2, along the line A—A. The support rods 5 are welded onto the outside edge 11 of the end portion 11. For clear definition of the weld points, at its outside edge the end portion 11 is provided with a protruding and cross-sectionally approximately triangular bead 9.

Figure 4A:
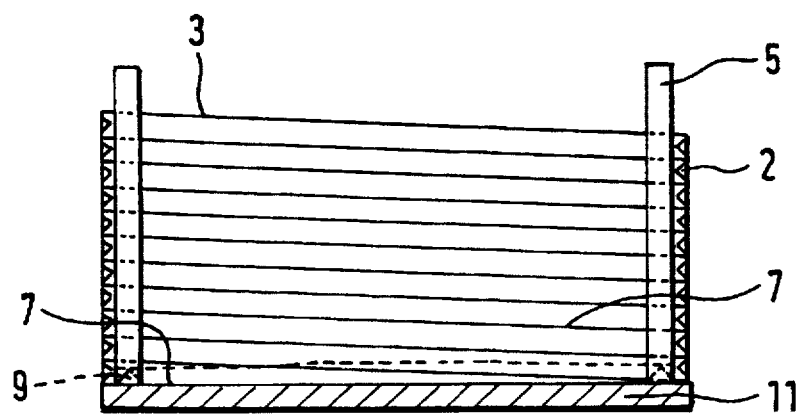

FIG. 4a shows a cross section through the lower portion of the helical filter candle shown in FIG. 2. The wire 2 is wound in windings 3 around the support rods 5 so that a spacing 7 remains between the individual windings 3. The wire possesses an essentially triangular profile.

Figure 4B:
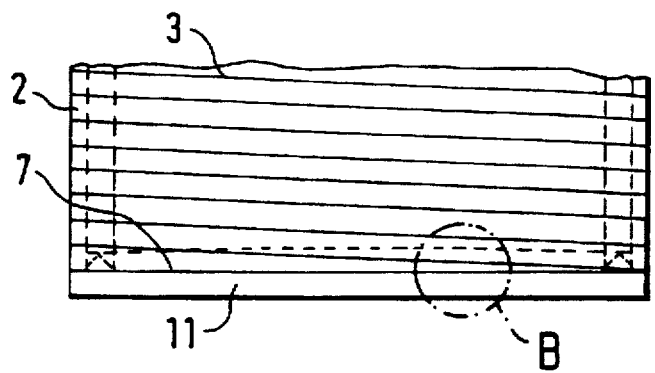

FIG. 4b shows a side view of a detail of the helical filter candle shown in FIG. 4a. In FIG. 4b, the spacing between the last of the windings 3 of the wire 2 and the end portion 11 is clearly visible.

Figure 5:
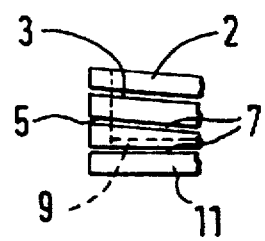

FIG. 5 shows an enlarged detail B shown in FIG. 4b. The final winding 3 of the wire 2 is ground on the side oriented toward the end portion in such a way that it possesses a surface that is parallel to the surface of the end portion 11. Spacings 7 are formed between the individual windings 3 of the wire 2 as well as between the final winding 3 of the wire and the end portion 11, said spacings possessing a width of approximately 40–110 µ. In the end area, the support rods 5 are welded onto the end portion 11. The circumferential bead 9 serves the precise location of the support rods on the end portion 11. The width of the spacing 7 between the individual windings 3 is in principle uniform over the entire length of the filter candle 1. In order to attain this uniform spacing width, the support rods 5 are shortened in their end area 8, i.e. approximately in the area of the three to five last windings 3 of the wire 2. This shortening in the end area 8 will occur because of the pressure required for welding as well as the heat from welding in the end area 8.

Figure 6A:
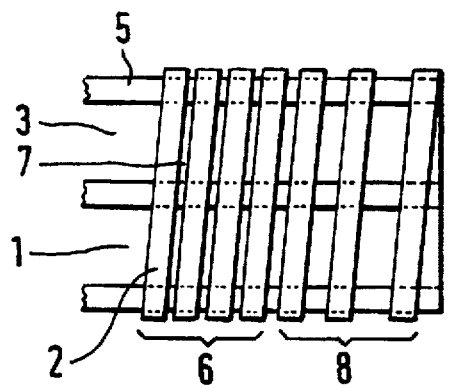

FIG. 6a shows schematically a first step of the method for manufacturing the filter candle 1 according to the invention. A wire 2 is wound in windings 3 over a support structure comprising support rods 5 in such a way that between the individual windings 3 a spacing 7 of a specific width (approximately 70 µ plus/minus 40 µ) is formed in the middle area 6 of the support rods. In the end area 8 of the support rods 5, the windings 3 are formed in such a way that the spacing 7 between the individual windings is greater (approximately 500 μ) than the spacing 7 in the middle area 6 of the support rods. The wire 2 is welded to the support rods 5 by means of localised welding.

Figure 6B:
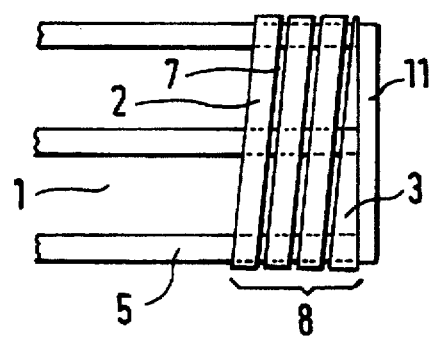

FIG. 6b shows the helical filter candle shown in FIG. 6a, wherein the last of the windings 3 has been ground flat in such a way that it lies parallel to the surface of an end portion 11, said end portion having been welded on. By means of the welding procedure, a pressure is exerted on the support rods 5. Apart from that, in their end area 8 the support rods are heated through welding. Through the combination of pressure and heat, the support rods are shortened in their end area 8. This also causes a reduction of the spacing width of the spacing 7 in the end area 8. Through the selection of a greater spacing when winding the wire 2 onto the support structure 5 in the end area 8, after welding on the end portion 11 the spacing 7 will possess a homogenous spacing width over the entire length of the filter candle.

Figure 7:
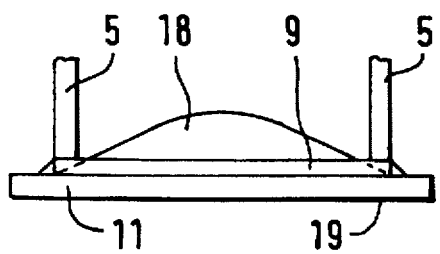

FIG. 7 shows an end portion 11 possessing a middle area 18 and an edge area 19. The surface of the middle area 18 protrudes into the inside of the filter candle 1. By means of this shape, improved backflushing behaviour will be attained in the area of the end portion 11 of the filter candle 1. Apart from that, a circumferential bead 9 is provided in the edge area 19 of the end portion 11, said bead serving the exact positioning of the support rods 5.

Figure 8:
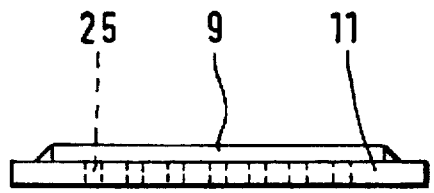

FIG. 8 shows a further embodiment of an end portion 11. The end portion 11 is provided with perforations 25 that likewise improve backflushing behaviour. The perforations possess a minimum diameter corresponding approximately to the width of the spacing 7. Naturally, the embodiments shown in FIG. 7 and 8 can be combined, by which means a further improvement in backflushing behaviour can be attained.

Figure 9A:
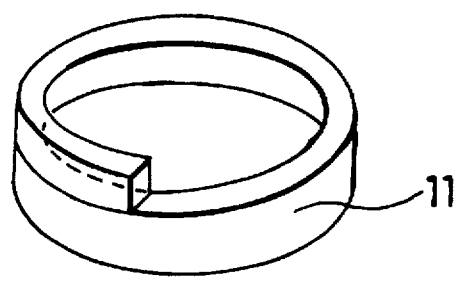

FIG. 9a shows schematically an end portion 11 possessing a shape in its edge area corresponding to the shape of the final winding of the wire 2. In this way, the final winding 3 of the wire 2 requires no further working, and an exactly defined spacing between the end portion 1 and the final winding 3 can still be attained.

Figure 9B:
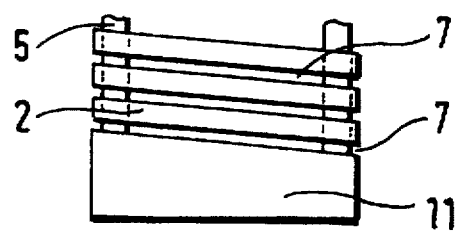

FIG. 9b shows a filter candle 1 with an end portion 11 according to FIG. 9a. The special shape of the end portion 11 can comprise a circumferential bead (as in FIG. 9a) as well as a removal of material in the edge area of the end portion 11.

Figure 10:
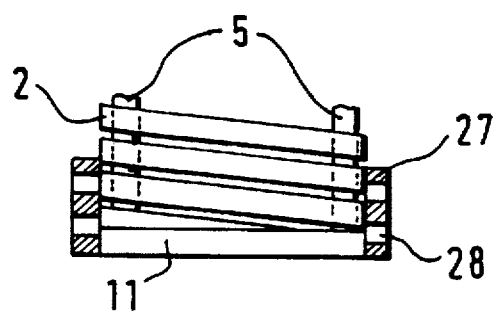

FIG. 10 shows a further embodiment of a helical filter candle. Because the spacing between the wire 2 and the end portion 11 is exactly defined in the case of a filter candle according to the invention, the use of a state-of-the-art shrink sleeve in the lower area of the helical filter candle 1 can be dispensed with. If, for stability reasons, such a shrink sleeve 27 is nevertheless desired, backflushing behaviour of a quality similar to sleeveless helical filter candles 1 can be attained if the sleeve 27 is provided with borings. The borings 28 can possess a diameter that is greater than the width of the spacing 7. Filtration will be ensured by the wire 2. Due to the borings 28, however, particles collecting between the sleeve 27 and the wire 2 can be subjected to backflushing without problems.

Inasmuch as the invention is subject to modifications and variations, the foregoing description and accompanying drawings should not be regarded as limiting the invention, which is defined by the following claims and various combinations thereof:

We claim:

1. A helical filter candle (1) for settling filtration of beverages with a support structure (4) of support rods (5) and a wire (2) wound helically around the support structure (4) in windings (3), in a middle area (6) and in two end areas (8) of the support rods (5), wherein a spacing (7) with a defined width is left between the windings (3)

and wherein the support structure (4) is welded on at least one side to a connection piece (10, 11), characterized in that the support rods (5) are compressed in said end area (8) lying adjacent to the connection piece (10, 11), and wherein the spacing (7) possesses a uniform width over the entire filter candle (1).

2. A helical filter candle (1) for setting filtration of beverages claim 1, with a support structure (4) comprising support rods (5) and a wire (2) affixed helically around the support structure (4) in windings (3), wherein a spacing (7) with a defined width is left between the windings (3), with a head portion (10) for attachment of the helical filter candle (1) to a perforated plate (16) of a holding device (12), and with an end portion welded to said support rods, characterized in that the wire (2) on its end oriented towards the end portion (11) and/or the surface of the end portion (11) oriented towards the head portion (10) is worked in such a way that a spacing is formed between the last of the windings (3) of the wire (2) and the surface of the end portion (10), said spacing possessing the same width as the spacing (7) defined by the windings (3) of the wire (2).

3. Helical filter candle according to claim 2 characterized in that the wire (2) is ground flat in the area of the last of its windings (3).

4. Helical filter candle according to claim 2, characterized in that the end portion (11) possesses a circumferential edge oriented towards the head portion (10) of the helical filter candle (1) and running at a pitch, wherein the said pitch of the said circumferential edge corresponds to the pitch of the helically applied wire (2) of the helical filter candle (1).

5. Helical filter candle according to claim 2, characterized in that the end portion (11) possesses a middle area (18) and an edge area (19) wherein the middle area (18) possess a lesser distance to the head portion (10) of the helical filter candle (1) than the edge area (19).

6. Helical filter candle according to claim 5, characterized in that the end portion (11) possesses a circumferential bead (9) for defined accommodation of the support rods (5).

7. A method of manufacture of a helical filter candle (1) for settling filtration of beverages characterized by the following steps:

1) application of a wire (2) in the form of helical windings (3) onto a wire structure (4) of approximately cylindrically arranged support rods (5), wherein, in a middle area (6) of the support structure (4), a spacing (7) with a defined width is left between the windings (3), and wherein a spacing is left in each of at least three windings arranged in the end area (8) of the support structure (4), said spacing possessing a width that is greater than the spacing (7) in the middle area of the support structure (4);

2) attachment of a head and/or an end portion (10, 11) to the end areas (8) of the support structure (4) by means of electrical welding wherein the support rods (5) are compressed in the end area through the effect of force and heat in such a way that the spacing (7) between the windings (3) of the wire in the end area (8) of the support structure (4) is reduced to the same defined width as the spacing (7) in the middle area (6) of the support structure (4).

8. A method according to claim 7, characterized in that the final winding (3) of the wire (2) is ground flat prior to attachment of a head and/or an end portion (10, 11).

\* \* \* \* \*